United States Patent Office 3,083,227,
Patented Mar. 26, 1963

3,083,227
METHOD FOR MANUFACTURE OF
L-GLUTAMINE
Martin Everett Hultquist, Boulder, Colo., assignor to Arapahoe Chemicals, Inc., a corporation of Colorado
No Drawing. Filed Dec. 5, 1958, Ser. No. 778,302
3 Claims. (Cl. 260—534)

This invention relates to improvements in the manufacture of L-glutamine from gamma L-glutamyl hydrazide.

The reduction of gamma L-glutamyl hydrazide to form L-glutamine is a well known reaction. This reaction involves heating a solution of gamma L-glutamyl hydrazide in a solvent medium under suitable temperature and time conditions in the presence of a Raney nickel catalyst. One drawback of the heretofore employed prior art processes is that a large amount of sponge nickel (i.e., Raney nickel) catalyst must be used. This is not desirable for a number of reasons. When a large amount of an expensive catalyst, such as Raney nickel is required, there is a greater chance for catalyst loss during the reaction. Accordingly, time consuming and expensive procedures are required for catalyst recovery. Then too, the use of large amounts of Raney nickel catalyst is not only undesirable from an economic viewpoint, but also it involves a fire hazard since Raney nickel is pyrophoric, i.e., it burns spontaneously in air if it becomes dry.

In the prior art processes mentioned above, the production of L-glutamine, the crude L-glutamine contained in the reduction mixture is filtered to separate the L-glutamine filtrate from the bulk of the Raney nickel catalyst. The L-glutamine, however, usually contains large amounts of nickel ions. Prior to this invention, the solution was purified by the use of expensive nickel precipitating agents such, for example, as dimethylglyoxime, or by the employment of toxic materials such, for example, as hydrogen sulfide which form insoluble nickel salts.

Objects and advantages of the invention will be set forth in part hereinafter and in part will be obvious herefrom, or may be learned by practice with the invention, the same being realized and attained by means of the steps, methods, combinations and improvements pointed out in the appended claims.

The invention consists in the novel steps, methods, combinations and improvements herein shown and described.

It is an object of this invention to provide an improved method for the manufacture of L-glutamine from gamma L-glutamyl hydrazide where the amount of Raney nickel catalyst required for the required reduction step is greatly reduced. Another object of this invention is to provide a novel method for crystallization of L-glutamine directly from the filtered reduction mixture without prior removal of nickel ions, so as to produce a product which contains only small amounts of nickel contaminants which may be precipitated in conventional manner resulting in the production of pure L-glutamine in a more economical manner than has heretofore been possible.

It has been found that reduced amounts of Raney nickel catalyst may be employed when the reduction of gamma L-glutamyl hydrazide is carried out in aqueous medium in the presence of hydrazine. Prior to this invention, in order to obtain good yields of L-glutamine by the reduction of gamma L-glutamyl hydrazide, the Raney nickel catalyst had to be in an amount by weight at least equal to the amount of the hydrazide reduced. It has been discovered, however, that good yields of L-glutamine may be obtained using much lower amounts of Raney nickel than has heretofore been required if the reduction is carried out in the presence of hydrazine. For example, when the reduction is carried out in the presence of hydrazine in an amount such as from about .027 to .108 part by weight, and preferably .043 to .068 part by weight, based on a dry weight basis, per part of gamma L-gutamyl hydrazide, good yields of L-glutamine are obtained with Raney nickel catalyst in amounts as low as 0.4 part by weight per part of gamma L-glutamyl hydrazide. Preferably, when hydrazine is in an amount within the range indicated above, the nickel catalyst is in an amount from about 0.5 to about 1.0 part by weight per part of gamma L-glutamyl hydrazide. Of course, higher amounts of Raney nickel catalyst may be employed if so desired such, for example, as 1.5 parts by weight per part of the hydrazide, but for economical reasons it is not desirable to do so. In general, the reduction is carried out at a temperature in the range of about 40° C. to the reflux temperature of the reaction solution for a period of time until the reduction of the hydrazide to L-glutamine is complete. Usually the reaction is complete in about 20 minutes to about 5 hours. Temperatures below 40° C. may be used but the rate of reaction at temperatures below 40° C. is greatly reduced.

After reduction of the hydrazide to L-glutamine, the bulk of the Raney nickel catalyst is removed by filtration. L-glutamine is crystallized directly from the reduction mixture in a novel manner described hereinafter in detail. Small amounts of nickel carried by the crystallized glutamine are removed by decolorizing with carbon and treating the L-glutamine with a minor amount of a nickel precipitant thus producing pure L-glutamine.

As indicated above, L-glutamine is recovered from the reduction mixture by a novel method for crystallizing the L-glutamine from the reduction mixture.

More particularly, this method comprises adjusting the pH of the aqueous reduction mixture to an acidic state in the range of about 3.5 to about 5.5. A glutamine precipitating agent such, for example, as methanol then is added to the acidic mixture; glutamine being insoluble in methanol. On standing, glutamine crystallizes out of solution. The crystals of glutamine which separate are filtered off and washed.

The above described crystallization method of L-glutamine while not providing a completely pure glutamine since a small amount of dissolved nickel contaminant remains, does provide a very simple and efficient method for separating a substantial amount of dissolved nickel from L-glutamine. Such a method offers many advantages over prior art methods of purification relating to nickel precipitating purification processes. For example, in accordance with one prior art method disclosed in the Akabori Japanese Patent 28–1582, patented April 15, 1953, dimethylglyoxime, an expensive chemical, is added to the reduction mixture to precipitate the nickel ions dissolved therein. This method not only requires the use of large amounts of a most expensive nickel precipitating agent which is subject to some loss during use and recovery thereof, but it also requires a filtering operation for recovery of the nickel salts precipitated by this method. In accordance with another prior art method, sulfur containing precipitating agents have been used such, for example, as hydrogen sulfide as nickel precipitating agents. Such a method is not particularly desirable because it requires the use of sulfur containing materials having toxic properties as well as requiring a filtering operation for recovery of the nickel salts precipitated when the sulfur containing precipitating agents are added to the reduction mixture.

By crystallizing the L-glutamine from the reduction mixture in accordance with the instant invention rather than removing the bulk of dissolved nickel by prior art nickel precipitating methods, there is effectuated a drastic reduction in the amount of expensive nickel precipitating agent such, for example, as dimethylglyoxime ultimately required to remove the last traces of nickel from the L-glutamine. Moreover, the crystallization purification method of the instant invention avoids the use of toxic materials which might be suitable purifying agents in producing insoluble nickel salts, but which are not particularly desirable because of their toxic properties as well as requiring filtering of the finely divided nickel salts so produced.

As indicated earlier, glutamine containing traces of nickel purified in the aforementioned manner may then be further purified by complete removal of the nickel. More particularly, further purification of the glutamine may be effectuated by redissolving the L-glutamine in warm water; precipitating traces of nickel in the glutamine solution by the addition of dimethylglyoxime, decolorizing the L-glutamine with a suitable decolorizing agent such, for example, as carbon and then precipitating pure glutamine crystals by the addition of methanol.

The following Example I illustrates a working example for the reduction of gamma L-glutamyl hydrazide to glutamine in the presence of Raney nickel catalyst and hydrazine in accordance with the instant invention. Example I also illustrates the novel method of purifying L-glutamine in accordance with the instant invention.

EXAMPLE I

A suspension of 200 g. of sponge nickel catalyst in 800 ml. of water is heated to 80° C. and 400 grams of glutamyl hydrazide are added in increments (10–20 g. per increment) with cooling as required to maintain the temperature at 80–85° C. During the addition, 100 ml. of 17% hydrazine hydrate was added in increments (2.5–5 ml. per increment). The mixture is stirred for 15–20 minutes at 80–85° C. after all of the glutamyl hydrazide has been added. Unreacted nickel is then filtered off and washed with 200–300 ml. of water and the combined filtrates are rapidly evaporated to about 800 ml. The resultant solution is adjusted to pH 4.8 with about 900 ml. of acetic acid and then diluted with 2400 ml. of methanol. The mixture is cooled to 10–15° C. and allowed to stand overnight. The crystals of L-glutamine which separate are filtered off and washed with methanol. About 240 g. of L-glutamine contaminated with a small amount of nickel is recovered.

The L-glutamine is dissolved in 5 parts of water at 85° C. and treated with 8 to 16 g. of solid dimethylglyoxime and 6 to 10 g. of decolorizing carbon. The solids are removed by filtration and washed with a little water. The filtrate is diluted with about 2400 ml. methanol, cooled to 10° C. and filtered to recover about 215 g. of pure L-glutamine. This corresponds to a yield of about 59% of the theoretical amount based on the amount of gamma L-glutamyl hydrazide.

The comparison results reported in Table I below clearly show that the presence of hydrazine in the aqueous medium reduces the amount of nickel catalyst required in the reduction of gamma L-glutamyl hydrazide to L-glutamine. Using the reduction technique described in Example I, except for the amount of nickel and hydrazine, the following results were obtained in the reduction of 25 grams of glutamyl hydrazide.

Table I

| Grams of nickel | ml. of 85% hydrazine hydrate | Glutamine Produced, grams | Percent Ni | M.P., °C. |
|---|---|---|---|---|
| 12.5 | None | 8.0 | 2.8 | 178–179 |
| 25.0 | None | 15.3 | 0.8 | 182–182.5 |
| 12.5 | 2.5 | 16.5 | 0.9 | 179–180 |
| 25.0 | 2.5 | 16.4 | 0.7 | 180–181 |
| 12.5 | 1.25 | 14.6 | 0.8 | 179–181 |
| 12.5 | 5.0 | 9.8 | 0.9 | 179–181 |
| 6.25 | None | None | | |
| 6.25 | 2.5 | Trace | | |
| 6.25 | 5.0 | None | | |

It should be realized that the term "aqueous medium" as used in the specification and claims means a medium containing predominant amounts of water. Preferably, the aqueous medium consists entirely of water. If so desired, however, the medium may contain modifying amounts of water-soluble organic solvents such, for example, as methanol or ethanol up to amounts of 40% by volume.

The invention in its broader aspects is not limited to the specific steps, methods, combinations and improvements described but departures may be made therefrom within the scope of the accompanying claims without departing from the principles of the invention and without sacrificing its chief advantages.

What is claimed is:

1. The method of manufacturing L-glutamine from gamma-L-glutamyl hydrazide which comprises heating a solution of gamma L-glutamyl hydrazide in an aqueous medium containing hydrazine in the presence of Raney nickel catalyst to form L-glutamine contained in an aqueous reduction mixture, said above reaction being carried out at a temperature in the range of about 40° C. to the reflux temperature of the reaction medium with hydrazine being in an amount from about .027 to .108 by weight per part of gamma L-glutamyl hydrazide and nickel being in an amount of at least 0.4 part per part of gamma L-glutamyl hydrazide, and recovering L-glutamine from said aqueous reduction mixture.

2. The method of manufacturing L-glutamine from L-glutamyl hydrazide according to claim 1 wherein the L-glutamine is recovered from the aqueous reduction mixture by filtering said aqueous reduction to separate undissolved Raney nickel from an aqueous filtrate containing L-glutamine acid contaminated with dissolved nickel, adjusting the pH of said filtrate between about 3.5 to about 5.5, incorporating in said acid filtrate an L-glutamine precipitating agent which is a liquid in which L-glutamine is substantially insoluble, and permitting L-glutamine to crystallize out of solution.

3. In a process for the manufacture of L-glutamine from gamma L-glutamyl hydrazide by reduction of the hydrazide in an aqueous medium in the presence of Raney nickel catalyst to form L-glutamine contained in an aqueous reduction mixture, the improvement comprising the steps of filtering the aqueous reduction mixture to separate undissolved Raney nickel from an aqueous filtrate containing L-glutamine contaminated with dissolved nickel, adjusting the pH of said filtrate between about 3.5 to about 5.5, incorporating in said acidic filtrate an L-glutamine precipitating agent which is a liquid in which L-glutamine is substantially insoluble, and permitting the L-glutamine to crystallize out of solution.

References Cited in the file of this patent

UNITED STATES PATENTS

| 2,788,370 | Rath | Apr. 9, 1957 |
| 2,846,470 | Joyce | Aug. 5, 1958 |

FOREIGN PATENTS

| 28–1582 | Japan | Apr. 15, 1953 |

OTHER REFERENCES

Akabori et al.: Chem. Abs., vol. 48, p. 12796 (1954).